Patented June 29, 1954

2,682,517

UNITED STATES PATENT OFFICE 2,682,517

COATING COMPOSITION FOR FLOORING, WALLS, AND THE LIKE

Annis G. Asaff, Auburndale, Mass., assignor to Callaghan-Hession Corporation, Boston, Mass., a corporation of Massachusetts No Drawing. Original application June 11, 1948, Serial No. 32,543. Divided and this application September 13, 1950, Serial No. 184,726

8 Claims. (Cl. 260—29.6)

This invention relates to surface coatings or coverings for floors, walls and the like. The least expensive floor coverings today are surface coatings applied like paint with a brush. Usually two coats are applied and the covering is so thin that it wears through rapidly when subjected to any considerable traffic. Other floor coverings, such as linoleum and tiling are available as thin as one-eighth inch but there is little or no floor covering material available in thicknesses between the very thin brushable coatings and the one-eighth inch coverings. The primary object of my invention is to provide a new and improved coating composition that can be applied by trowel to floors, walls and the like in varying thicknesses within these limits and form a covering having desirable characteristics as hereinafter described.

While paints may be thickened with fillers or other means there is no satisfactory way of applying them in considerable thicknesses, due to the sticky nature of the material. Also, they will not dry readily unless filled to a point where adhesion and cohesion becomes lost. Asphalt and other film forming materials may be emulsified to remove the stickiness and then thickened with fillers and applied to desired thickness by brush or trowel. However, emulsions are not waterproof and consequently can neither be used out of doors nor where moisture is a problem. Furthermore, emulsions freeze and their shipping and storage therefore present many problems. Also, the process of emulsification limits emulsions to asphalts and the like of lower melting point.

In order to avoid the above limitations and provide certain other advantages, asphalt cut-backs or hot melts have been employed. Both of these methods permit the use of higher melting point asphalts and result in waterproof installations. However, cut-backs are similar to paints in that only thin layers may be applied because of the problem of drying. Furthermore, since cut-backs cannot be troweled to give a smooth surface the viscosity must be so adjusted as to permit brushing, thereby necessarily resulting in substantially reduced solids content. Also, since cut-backs are of a liquid consistency like paints, great difficulty is experienced in applying appreciable thicknesses on vertical surfaces because of sagging.

In the case of hot melts, the asphalt must be applied in thicknesses of at least one inch because of the problem of cooling. If thicknesses less than one inch of asphalt are applied the coating solidifies too rapidly for easy and smooth application. Furthermore, the danger and difficulty of handling hot melts poses many problems, especially from the standpoints of the workmen and the operations involved.

I have discovered that by combining certain film forming materials with a suitable solvent there is provided a vehicle adapted to receive and form a mastic with suitable aggregates, and, furthermore, that the addition of a predetermined amount of a mixture of alcohol and water thereto is effective to render the mastic plastic and cohesive and so change its initial sticky character to a non-adhesive character so that the mastic can be spread with a trowel. I have thus employed asphalt, chlorinated rubber, polystyrene and Vinylite as film forming materials and formed coating compositions therefrom that can be applied to desired thickness with trowel. A further object of the invention consists in the production of such vehicles and coating compositions, all as hereinafter more specifically described.

In describing the invention, Vinylite will be considered as the preferred film forming material employed. The purpose of the invention is so to formulate Vinylite that it can be applied very easily in appreciable thicknesses on horizontal or vertical surfaces without any of the difficulties attendant to the use of emulsions or solutions. I accomplish this object by employing suitable solvents for the Vinylite, including total active solvents in the class of oxygenated hydrocarbons including ketones and less active solvents in the class of aromatic hydrocarbons, the latter serving to decrease the solvent activity of the former and thereby produce a vehicle capable of responding to the action of a mixture of alcohol and water in removing stickiness, and to receive and form a mastic with suitable aggregates. A further feature of the invention includes the addition of a mixture of alcohol and water to the mastic for the purpose of rendering it plastic and cohesive and changing its initially sticky character to non-adhesive character so that it can be spread with a trowel. The steps embodied in producing the vehicle and mastic will now be specifically described in connection with Vinylite, which I have employed and found suitable.

The aromatic hydrocarbons which I have thus far employed include benzol, toluol and xylol. Other hydrocarbons high in aromatic content may also be employed. The oxygenated hydrocarbons thus far employed include methyl ethyl ketone, methyl isobutyl ketone, isophorone and cyclohexanone.

In the production of my improved vehicle and mastic I proceed by dissolving Vinylite, a copolymer of vinyl chloride and vinyl acetate, in suitable solvents and have found that xylol is the most suitable of the aromatic hydrocarbon solvents and that cyclohexanone is the most suitable of the oxygenated hydrocarbons. I have found that a solvent including xylol and cyclohexanone and comprising about 70 per cent by weight of xylol is most suitable for forming the desired vehicle of my invention. The proportions are as follows:

*Example 1*

70 parts xylol
30 parts cyclohexanone
25 parts Vinylite
15 parts tricresyl phosphate The resulting vehicle is formed into the mastic by mixing it with suitable aggregates. The aggregates which I have thus far employed include sand, mica and asbestos. A rapid hardening and waterproof coating can be made by mixing together the following.

*Example 2*

60 parts vehicle of Example 1
40 grams beach sand
5 grams asbestos
30 grams of a mixture of ⅓ water and ⅔ ethyl alcohol.

The vehicle and aggregates are combined and mixed to give a sticky mass which would be difficult to spread. The alcohol-water mixture is then added while mixing and a two phase separation occurs. The mix becomes thicker and a water-like liquid separates, while the mastic forms a coherent mass and loses its sticky character. Mixing separates adhering mastic from the sides of the container apparently incorporating it into the mass, leaving the walls of the container free and clean of mastic. The same results are obtained by adding mixtures of water and methyl, propyl or isopropyl alcohol instead of the water-ethyl alcohol mixture.

Upon taking out some of this mastic and spreading it with spatula in a layer about $\frac{1}{16}$ inch thick, very little stickiness was apparent, and the mastic could be smoothed similarly to a Portland cement, sand and water mixture. Overnight the mastic hardens sufficiently for ordinary practical use and is waterproof and adherent.

An alternative vehicle from which satisfactory mastics can be produced in accordance with Example 2 employs toluol in place of xylol as the aromatic component.

*Example 3*

70 parts toluol
30 parts cyclohexanone
25 parts Vinylite
15 parts tricresyl phosphate.

Tricresyl phosphate is present in the vehicles merely as a plasticizer for the Vinylite, and can be dispensed with to give a harder composition. Compositions applicable in greater thickness can be made by increasing the amount of aggregate used. Various surface effects, such as smoothness, sparkle, a hammered finish, or color can be had by incorporating mica, marble dust, or pigments in the mastic.

The compositions of this invention can be applied to surfaces of concrete, asbestos shingles, steel, glass, wood and Masonite, to name but a few examples. The compositions spread readily to the desired thickness on all these surfaces, form a secure bond therewith and provide resistance to moisture and acids comparable to cut-back asphalt.

This application is filed as a division of my pending application, Serial No. 32,543 filed June 11, 1948, now Patent number 2,596,323.

Having disclosed my invention and described in detail preferred embodiments thereof, I claim and desire to secure by Letters Patent:

1. A surface coating mastic composition comprising a mixture of aggregate filler material and a vehicle comprising about 25 parts by weight of vinyl acetate-vinyl chloride copolymer dissolved in about 100 parts by weight of a solvent comprising about 70 per cent by weight of a liquid aromatic hydrocarbon and about 30 per cent by weight of a ketone, and a solution containing about ⅓ water and about ⅔ of an aliphatic alcohol having less than 4 carbon atoms in an amount sufficient to cause a two-phase separation of said mixture to produce a plastic cohesive phase of such non-sticky character that it can be spread with a trowel.

2. The composition defined by claim 1 wherein the aromatic hydrocarbon is selected from the group consisting of benzol, toluol and xylol and the ketone is selected from the group consisting of methyl ethyl ketone, methyl isobutyl ketone, isophorone and cyclohexanone.

3. The composition defined by claim 1 wherein the aromatic hydrocarbon is xylol and the ketone is cyclohexanone.

4. The composition defined by claim 1 wherein the aromatic hydrocarbon is toluol and the ketone is cyclohexanone.

5. The method of forming a surface coating mastic composition comprising adding and mixing a solution containing about ⅓ water and about ⅔ of an aliphatic alcohol having less than 4 carbon atoms, to a mixture of aggregate filler material and a vehicle comprising about 25 parts by weight of a vinyl acetate-vinyl chloride copolymer dissolved in about 100 parts by weight of a solvent comprising about 70 per cent by weight of a liquid aromatic hydrocarbon and about 30 per cent by weight of a ketone, said solution being added in an amount sufficient to cause a two-phase separation of said mixture, one phase being plastic and cohesive and of such non-sticky character that it can be spread with a trowel.

6. The composition defined by claim 5 wherein the aromatic hydrocarbon is selected from the group consisting of benzol, toluol and xylol and the ketone is selected from the group consisting of methyl ethyl ketone, methyl isobutyl ketone, isophorone and cyclohexanone.

7. The composition defined by claim 5 wherein the aromatic hydrocarbon is xylol and the ketone is cyclohexanone.

8. The composition defined by claim 5 wherein the aromatic hydrocarbon is toluol and the ketone is cyclohexanone.

References Cited in the file of this patent

UNITED STATES PATENTS

| Number | Name | Date |
|---|---|---|
| 2,319,852 | Doolittle | May 25, 1943 |
| 2,386,403 | McDonald et al. | Oct. 9, 1945 |
| 2,389,460 | Rinehart | Nov. 20, 1945 |

FOREIGN PATENTS

| Number | Country | Date |
|---|---|---|
| 596,007 | Great Britain | Dec. 24, 1947 |